(12) United States Patent
Gu

(10) Patent No.: US 6,631,170 B1
(45) Date of Patent: Oct. 7, 2003

(54) RADIO FREQUENCY RECEIVER

(75) Inventor: Qizheng Gu, San Diego, CA (US)

(73) Assignee: Nokia Corporation, Irvin, TX (US)

( * ) Notice: Subject to any disclaimer, the term of this patent is extended or adjusted under 35 U.S.C. 154(b) by 0 days.

(21) Appl. No.: 09/454,326

(22) Filed: Dec. 3, 1999

(51) Int. Cl.$^7$ .................... H03K 9/00; H04L 27/06; H04L 27/14; H04L 27/22
(52) U.S. Cl. ............... 375/316; 375/329; 375/349; 455/323
(58) Field of Search ................ 375/316, 329, 375/340, 346, 349, 324, 332, 259, 269; 455/550, 131, 313, 323, 317, 324, 302, 304; 329/304

(56) References Cited

U.S. PATENT DOCUMENTS

| | | | | |
|---|---|---|---|---|
| 5,579,347 A | * | 11/1996 | Lindquist et al. | 375/346 |
| 5,778,022 A | * | 7/1998 | Walley | 375/152 |
| 5,826,180 A | * | 10/1998 | Golan | 455/302 |
| 5,892,792 A | * | 4/1999 | Walley | 375/152 |
| 5,937,335 A | * | 8/1999 | Park et al. | 455/86 |
| 5,999,578 A | * | 12/1999 | Ha | 375/345 |
| 6,185,418 B1 | * | 2/2001 | MacLellan et al. | 455/418 |
| 6,246,675 B1 | * | 6/2001 | Beasley et al. | 370/342 |
| 6,246,867 B1 | * | 6/2001 | Jakobsson | 455/324 |
| 6,301,287 B1 | * | 10/2001 | Walley et al. | 375/140 |
| 6,334,051 B1 | * | 12/2001 | Tsurumi et al. | 455/324 |
| 6,366,622 B1 | * | 4/2002 | Brown et al. | 375/322 |
| 6,411,646 B1 | * | 6/2002 | Walley et al. | 375/146 |

* cited by examiner

Primary Examiner—Jean B. Corrielus
(74) Attorney, Agent, or Firm—Milan Patel; Brian Rivers; Tom Weber

(57) ABSTRACT

An RF signal reception method includes mixing a received signal and a local oscillator signal to form a down converted signal. The down converted signal formed from the received signal is a modulated non-zero low frequency carrier referred to as a low frequency carrier desired signal. The low frequency carrier desired signal is extracted from undesired signals and interferers by using low or band-pass filters and the resulting signal is AC coupled to low frequency amplifiers for amplification. A digital representation of the low frequency carrier desired signal is then formed by digitally sampling at an analog-to-digital converter. The digitized desired signal may be further processed by digital signal processing devices for obtaining voice and/or data messages.

22 Claims, 4 Drawing Sheets

RADIO FREQUENCY RECEIVER

FIELD OF INVENTION

This invention relates generally to electronic devices and, more particularly, to a radio frequency receiver for mobile communication.

BACKGROUND INFORMATION

In a code division multiple access (CDMA) wireless phone system, information is transmitted over radio frequency (RF) communication channels that are established between a base station and one or more mobile stations. Each mobile station includes a radio frequency receiver circuitry used to select signals in a desired communication channel, and to convert the selected radio frequency signals to baseband digital signals for further signal processing.

Mobile station receivers may be based on a number of different technologies. For example, heterodyne signal reception technology may be used. In a heterodyne receiver, a received RF signal is applied to an image-reject filter and then to a low-noise amplifier (LNA). The resulting signal is mixed with a local oscillator to produce a signal having an intermediate frequency (IF) carrier. The IF signal is then passes through an IF filter which can be used to suppress out-of-channel interference, thus performing channel selection. The transmitted information may then be extracted from the selected channel. Heterodyne receiver designs may struggle with an undesirable tradeoff between image rejection and interferer channel suppression.

The use of direct conversion receivers has also been proposed as a solution to some of these issues. In a direct conversion receiver, also called a zero-IF receiver, the signal of interest is converted directly to a zero frequency carrier rather than to an intermediate frequency carrier. Direct conversion receivers are further described in Design Considerations for Direct-Conversion Receivers, Behzad Razavi, IEEE Transactions on Circuits and Systems: Analog and Digital Signal Processing, Vol. 44, No. Jun. 6, 1997 [Razavi]. Razavi asserts that direct conversion receivers have several advantages over heterodyne receivers including lower cost, configuration flexibility, circumvention of the heterodyne image rejection problem and easier monolithic integration.

Razavi notes that previous attempts to use direct conversion technology have met with limited success.

SUMMARY

In general, in one aspect, the invention features a signal reception method. The method includes mixing a received RF signal and a local oscillator signal at a signal image rejection mixer to form a frequency down converted signal. The received RF signal includes information data that modulates a RF transmission carrier. The down converted signal formed from the received RF signal is a modulated non-zero low frequency carrier referred to as a low frequency carrier desired signal. A digital representation of the low frequency carrier desired signal is then formed. This signal reception method is called a pseudo direct conversion (PDC) architecture.

Implementations may include one or more of the following features: a local oscillator signal may be selected such that, during down-conversion of the received RF signal, interference signals are shifted or folded onto frequencies that are lower or greater than the frequencies occupied by the low frequency carrier desired signal. The down converted signal may then be low-pass or band-pass filtered to attenuate frequencies outside the spectrum of the low frequency carrier desired signal. The low frequency carrier desired signal may be amplified and digitally sampled at an analog-to-digital converter to form a digital representation of the desired signal.

Implementations may also include a quadrature frequency down-converter consisting of two image rejection mixers, a power splitter in signal path, and a $\pi/2$ phase shifter implemented in a path between the local oscillator and one of the image rejection mixers. The received RF signal is split into two portions. A first portion is directly mixed with the local oscillator signal at the first image rejection mixer to form an I channel low frequency carrier desired signal and to form frequency reduced interferers and/or spectrum folded interferers. A second portion is mixed with a $\pi/2$ phase shifted version of the local oscillator signal to form a Q channel low frequency carrier desired signal and to form frequency reduced interferers and/or spectrum folded interferers. The resultant desired signals (and interferers) in the I and Q channels have the same carrier frequency and magnitude, however $\pi/2$ phase shift exists between the two desired signals.

Implementations may also include one or more of following features: the down-converted desired signals in the I and Q channels are filtered by low-pass filters or band-pass filters. Also, the I and Q channels are amplified through alternative current (AC) coupling approach. The signal in each of the I and Q channels is sampled by an analog-to-digital converter (ADC) in its respective channel. The sampling rate of these ADCs should be $2 \times f_d + BW$ where $f_d$ is the low carrier frequency of the desired signal and BW is the bandwidth of the desired signal. The digitized I and Q channel desired signals are low-pass or band-pass filtered and are summed together in a complex form $I \pm jQ$ where $j = \sqrt{-1}$ and sign $+/-$ depends whether on the down-conversion condition of the received signal frequency is higher or lower than the local oscillator frequency. Thus, the desired signal can be easily selected from interferers by using a digital band-pass filter.

In general, in another aspect, the invention features a wireless receiving apparatus. The apparatus includes an antenna at which a radio frequency (RF) signal is received. The received RF signal is mixed with a local oscillator signal at a signal image rejection mixer to form a frequency down converted signal. The received signal includes information data that modulates an RF transmission carrier. The down converted signal formed from the received RF signal is a modulated non-zero low frequency carrier referred to as a low frequency carrier desired signal. Using a digital-to-analog converter, a digital representation of the low frequency carrier desired signal is then formed. The receiver based on this signal reception method is called a pseudo direct conversion receiver (PDCR) architecture.

Implementations of the PDCR may include one or more of the following advantages. The pseudo-direct conversion (PDC) receiver architecture reduces the need for IF surface acoustic wave (SAW) filters in the RF section of the receiver. Low-pass filters (LPFs) or band-pass filters (BPFs) used in the PDC receiver may be designed and implemented in a monolithic integration circuit (IC) chip. Receiver saturation due to DC coupling between circuits can be reduced or eliminated through the use of AC coupling between circuit elements in the PDC receiver. Residual DC offsets may be removed using digital domain processing. Even-order distortion effects can be reduced or eliminated. The PDC receiver may be designed so that interferer signals generated by second order distortion produced by the nonlinearity of low noise amplification and down-conversion are located outside the spectrum of the desired signal; thus, there is no direct interfering to the desired signal. Distortion due to flicker noise may be maintained outside the frequency range of interest. Implementations may not need to separate I and Q channels, thereby no I/Q mismatch issue arises.

Implementations may also include one or more of the following advantages. PDC receiver architectures may be used with a variety of wireless mobile communication systems including third generation (3G CDMA) which includes direct spread wideband CDMA (WCDMA), and multi-carrier CDMA (MC-DMA). For example, a PDC receiver can operate in either the WCDMA mode or the MC-CDMA mode by altering the program code that is executed by a digital filter. In the WCDMA mode, a 3.84 MHz single pass band filter algorithm is executed, and in the MC-CDMA mode, a multiple pass band filter bank with each filter having a band spacing of 1.25 MHz and bandwidth of 1.23 MHz is executed.

Implementations may have other and/or alternative advantages, as will be clear from the description and claims that follow.

DETAILED DESCRIPTION

Figure 1:
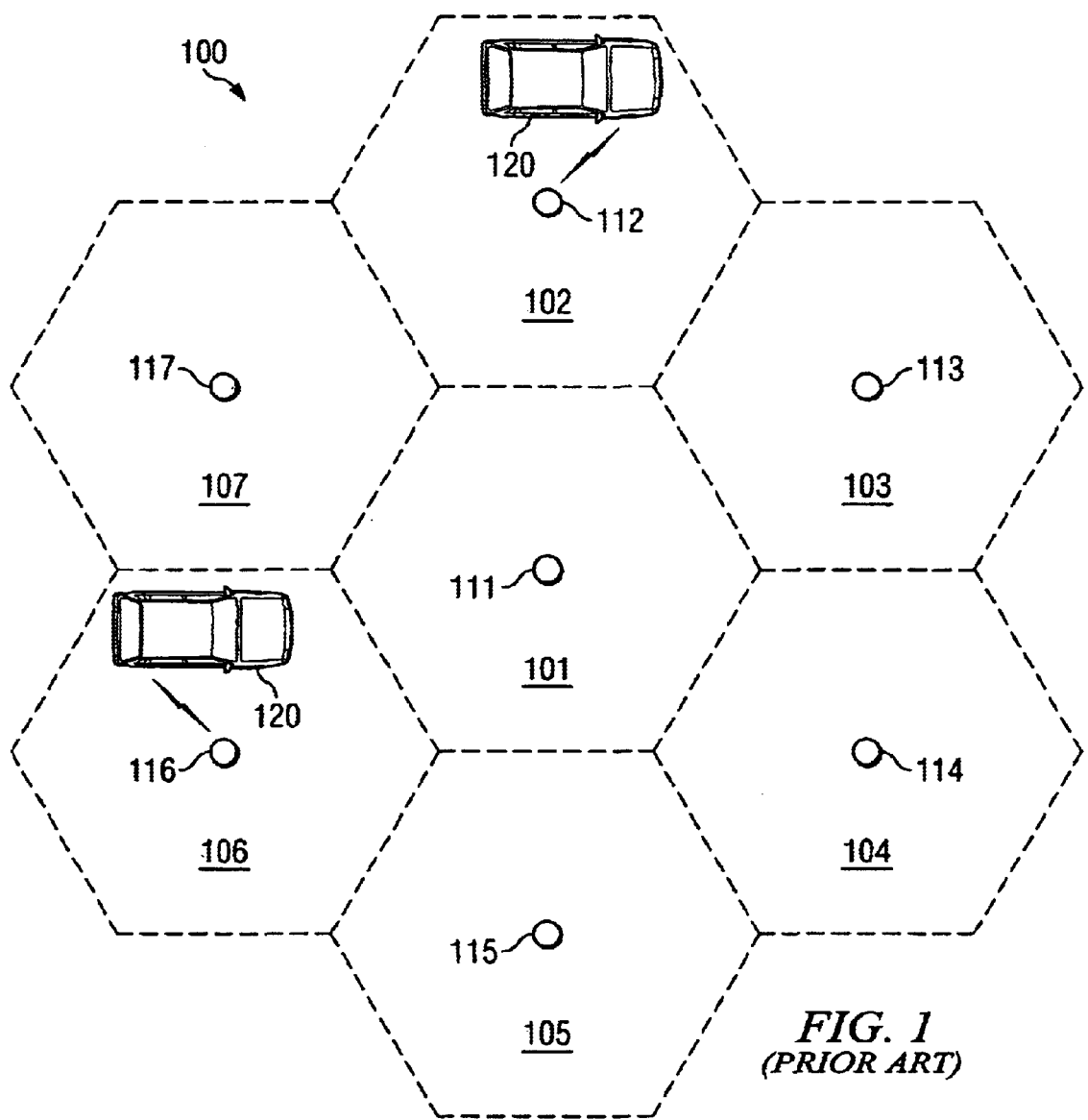
FIG. 1 is a block diagram of a of a mobile communication system into which an embodiment of the present invention may be implemented.

Referring to FIG. 1, a wireless communication system into which an embodiment of the present invention is implemented is shown. The system 100 includes cells 101–107. Each cell 101–107 includes a radio frequency (RF) transmitting and receiving base station 111–117 that provides for radio frequency communication with one or more mobile stations 120 within the cell. In FIG. 1, receivers according to the embodiments of the invention are implemented into each of mobile stations 120. Radio frequency channels provide a path for the communication of signals between each mobile station 120 and an associated base station 111–117. The system 100 may be implemented in accordance with Telecommunications Industry Association standard TIA/EIA IS-95-B Mobile Station-Base Station Compatibility Standards for Dual-Mode Wideband Spread Spectrum System ("IS-95B") or in accordance with the Japanese Association of Radio Industries and Businesses (ARIB) standard Specification of Mobiles Station for 3G Mobile Station System Version 1.0, (WCDMA) or IS-2000 of cdma 2000 standard for multi-carrier CDMA (MC-CDMA) standard.

Figure 2:
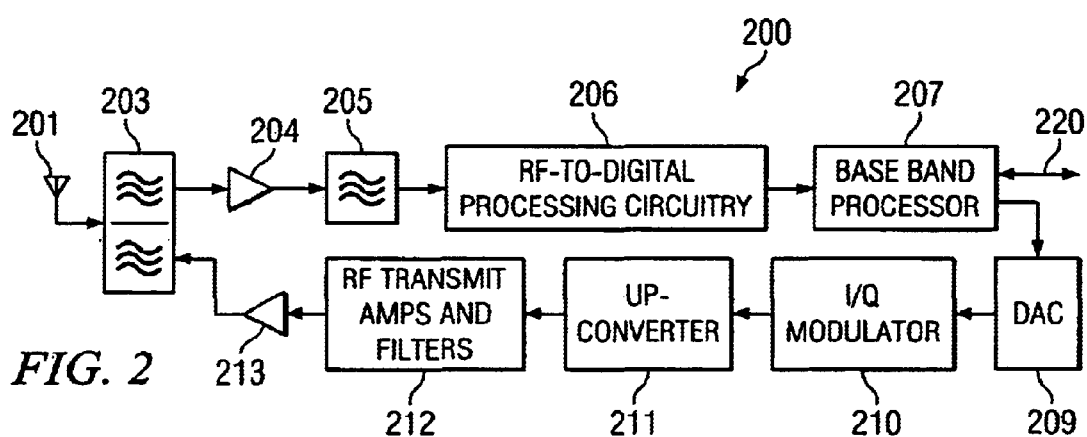
FIG. 2 is a block diagram of a mobile station receiver according to an embodiment of the invention.

FIG. 2 shows a block diagram of a radio frequency (RF) section 200 according to an embodiment of the invention that may be implemented into mobile stations 120. The RF section 200 includes receiver circuitry 204–207 and transmitter circuitry 209–213. The receiver circuitry 204–207 operates to amplify relatively weak RF signals received at the antenna 201 from a base station 111–117 (FIG. 1), and to select a particular RF channel from among those contained in the received RF signals. Transmitter circuitry 209–213 operates to transmit an RF channel to a base station or other RF receiver. The mobile station may include a duplexer 203 that helps to separate reception signals from transmission signals and vice versa, and to minimize leakage of signals output from the transmitter circuitry 209–203 to the antenna 201, into the receiver circuitry 204–207.

Signals received at the antenna 201 and passing through the duplexer 203 may be provided to the first amplification and filtering stage 204–205 prior to channel selection. The first amplification stage may include a low-noise amplifier (LNA) 204 that operates over a broad frequency band with a low-noise figure. For example, in a WCDMA implementation using the 2110–2170 MHz receiver spectrum, the amplifier 204 may operate over a frequency range of at least 2110–2170 MHz. A band-pass filter 205 may follow the LNA 204 to attenuate undesired signals and/or interferers, but it allows desired signal frequencies to pass to an RF-to-digital signal processing (RFDSP) circuitry 206.

After initial amplification and band-pass filtering, the received RF signal 205a is provided to the RF-to-digital signal processing circuitry 206. The RF-to-digital processing circuitry 206 employs a novel signal processing technique, referred to herein as pseudo-direct conversion (PDC), to select and amplify the desired signal and to reject or filter out interfering signals. Using PDC, the RF-to-digital signal processing circuitry 206 down converts the carrier frequency of the desired signal directly to a non-zero low frequency wherein commercially available conventional analog-to-digital converters (ADCs) and digital signal processing (DSP) devices can properly perform with acceptable power consumption.

Figure 3A:
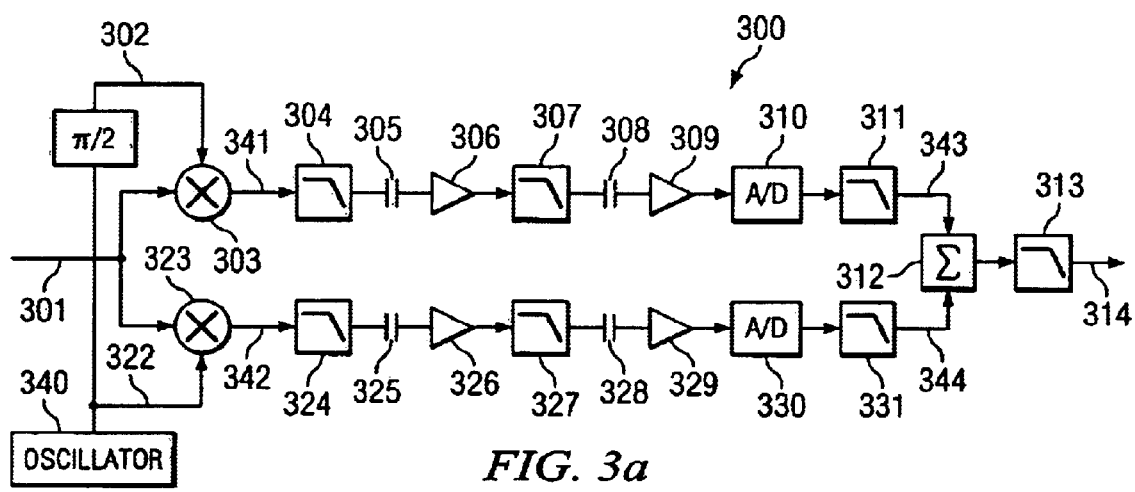
FIGS. 3a and 3b are block diagrams of PDC signal processing circuitry of the receiver of FIG. 2.
Figure 3B:
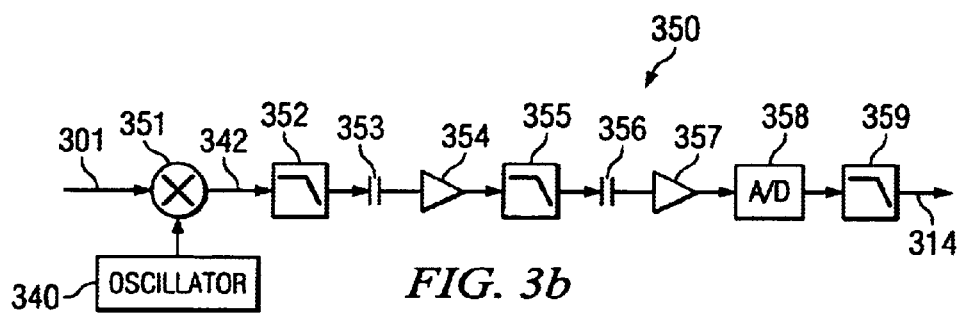

FIGS. 3a and 3b show details of alternative implementations 300 and 350 of RF-to-digital signal processing circuitry 206. In the first implementation 300, shown in FIG. 3a, a received signal 301 is separated by image rejection mixers 303 and 323 into two channels, I and Q, 341 and 342, for processing by circuit elements 304–311 and 324–331 producing outputs 343 and 344, respectively. The two outputs 343 and 344 are recombined by a summing circuit 312. The first implementation 300 may provide the capability of unfolding the down converted and folded signal spectra for improving interferer suppression properties. In a second implementation 350, shown in FIG. 3b, the received signal 301 is processed as a single channel. Circuitry 350 may provide advantages such as a simpler implementation, and no I and Q channel mismatching issue.

The RF-to-digital signal processing circuitry 300 or 350 receives RF signal 301. RF signal 301 is an amplified version of a relatively weak RF signal that is received at antenna 201. RF signal 301 contains data that modulates an RF carrier transmitted from a base station. Using PDC, the circuitry 206 down-converts the desired signal carrier frequency to a non-zero low frequency. For example, as further explained below, in a WCDMA mobile station implementation, the circuitry 206 may down-convert a received WCDMA signal with a carrier within frequency 2110–2170 MHz, to a new carrier frequency of approximately 6.25 MHz. The circuitry 206 may filter the desired signal from the interferers by using low-pass filters or band-pass filters, and amplify the desired signal to a certain level for digitization. Then the processed desired signal is sampled and digitized at the ADC. The digitized desired signal is then provided to digital signal processing (DSP) circuitry, such as a CDMA RAKE receiver.

In processing the received RF signal, the circuitry 300 or 350 performs a carrier frequency down-conversion. The carrier down-conversion can be performed by either a single RF image rejection mixer 350 as shown in FIG. 3b, or an RF quadrature image rejection mixer 300 as shown in FIG. 3a. The resultant low carrier frequency of the desired signal in general should be less than the frequency separation of the transmission frequency band and reception frequency band in a full duplex communication system. For example, in a PCS CDMA system, transmission frequency band of the mobile station is 1850 to 1910 MHz, and the reception frequency band is 1930 to 1990 MHz. The frequency separation, here, between the transmission and the reception frequency bands is only 20 MHz. Therefore, in this case the low carrier frequency of the desired signal must be less than 20 MHz. The selection of the low carrier frequency also depends upon the bandwidth of the desired signal, the interferers' position, the sampling rate of ADC, and the speed of other digital processing circuitry used in the receiver. The image rejection mixers used in circuitry 300 or 350 are used to reject the image of the desired signal. Based on today's RF integrated circuit technology, it is not difficult to achieve 20–25 dB image rejections in 2 GHz region. The image rejection capability may also help to partially suppress interferers folded into receiver low-pass band.

Figure 4A:
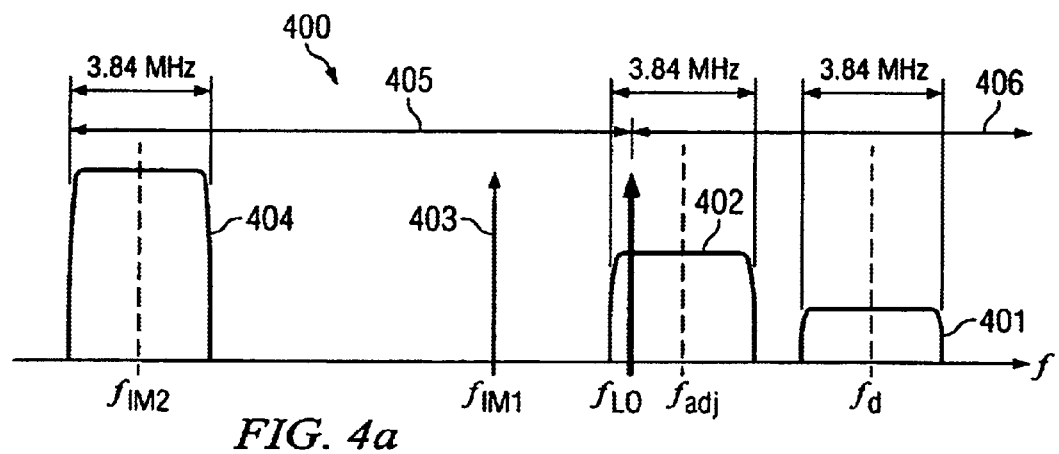
FIGS. 4a through 4e are exemplary signal diagrams of signal processing in the circuitry of FIGS. 3a and 3b.
Figure 4B:
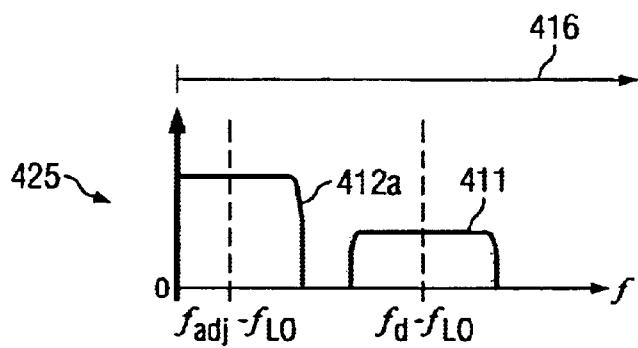
Figure 4C:
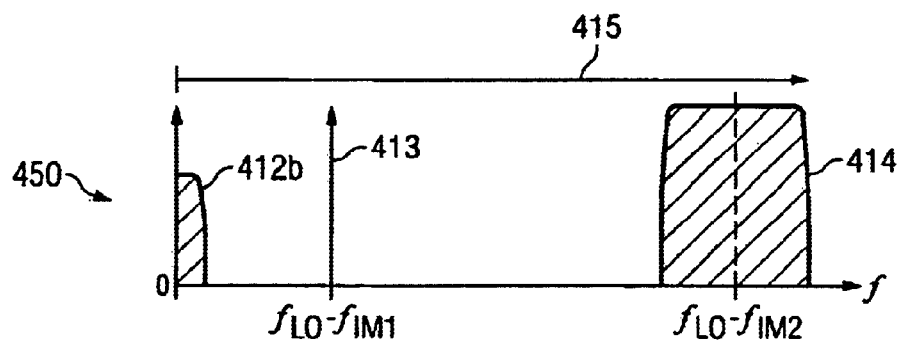
Figure 4D:
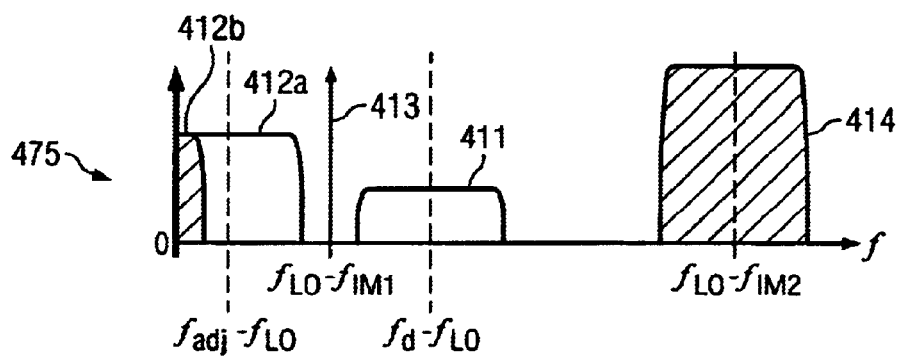

Referring to FIG. 3a, circuitry 300 includes a quadrature frequency down-converter consisting of two image rejection mixers 303 and 323, a power splitter 346 in the RF signal path, and a $\pi/2$ phase shifter 345 in the path from the local oscillator 340 to one of the mixers 303 or 323. The received RF signal 301 is separated into two power signals. An exemplary signal is shown in FIG. 4a. A first separated RF signal directly mixes with a local oscillator signal 322 to form a first frequency down-converted signal 342 referred as the I channel signal. An exemplary the first frequency down-converted signal is shown in FIG. 4d. A second separated RF signal mixes with a $\pi/2$ phase shifted local oscillator signal 302 to form second frequency down-converted signal 341 referred as the Q channel signal. The signals 341 and 342 in these two channels have the same frequency and magnitude, but an approximately $\pi/2$ phase difference exists between the two. Signals 341 and 342 are then further filtered and amplified by circuitry 304–311 and 324–331, respectively. In the following discussion, filtering and amplification of signal 341 by circuit components 304–311 is discussed in detail. Signal 342 is similarly filtered and amplified by corresponding components 324–331.

Signals 341 and 342 may contain unwanted signal components, described below (FIGS. 4a–4e). These unwanted components may be removed from signal 341 using a low-pass or band-pass filter 304. In the WCDMA example given above (in which the desired signal 411 is a 3.84 MHz signal centered at a carrier frequency of 6.25 MHz), the low-pass filter (LPF) 304 may be a multi-pole LPF with a corner frequency of 8.25 MHz or a 4.25 Mhz–8.25 MHz BPF. After filtering by LPF 304, the resulting signal (which includes the low frequency carrier desired signal as well as other frequency signals within the filtering bandwidth) is coupled through capacitor 305 (which removes the direct current components from the filtered signal) to a first amplification stage. The first amplification stage may include a low-frequency broadband amplifier 306 and a low-pass or band-pass filter 307. In the exemplary WCDMA implementation, amplifier 306 may have a bandwidth of approximately 10 MHz, low-pass filter 307 may have corner frequencies of approximately 8.25 MHz (or a band-pass filter may have a pass band from frequency 4.25 MHz to 8.25 MHz), and coupling capacitor 305. The capacitance of the coupling capacitor 305 may be empirically determined based on, for example, the desired signal carrier frequency, the bandwidth of the low frequency desired signal, and the rejection of the undesired low frequency signals. The signal output by the low-pass filter 307 may then be coupled through capacitor 308 to a second amplifier 309. The characteristics of capacitor 308 and amplifier 309 may be similar to those of capacitor 305 and amplifier 306, respectively. In some implementations, a single amplifier can be used while in other implementations, additional amplification stages may be used.

The filtered and amplified signal 341 can then be digitized by an analog-to-digital converter (ADC) 310. The sampling rate and the number of bits used for sampling the signal may depend on the strength of interferers in the amplifier 309 output, as well as the required dynamic range of the PDC receiver. For example, the WCDMA specification recommends a receiver sensitivity of −110 dBm and a maximum permitted intermodulation interference of −46 dBm. Thus, the dynamic range between the smallest desired signal and the interference signal is −46dB+110dB=+64 dB. The ADC 310 should have an adequate bit width to handle this dynamic range without clipping. The sampling rate of the ADC, $f_s$ depends on the carrier frequency and bandwidth of the low frequency carrier desired signal. In general, the rate $f_s$ should be at least twice the highest frequency component in the low frequency desired signal. This may also be expressed as the requirement $f_s \geq ((2 \times f_d)+BW)$ (where $f_d$ is the carrier frequency and BW is the bandwidth of the low frequency carrier desired signal).

The digital output from converter 310 may then be filtered by a digital filter 311 to produce the filtered output signal 343. Filter 311 may be a digital low-pass filter or band pass filter. The signal 343 contains a digitized representation of the filtered signal 341 (including the low frequency carrier desired signal). Output 344 contains a similarly processed representation of signal 342.

Output signals 343 and 344 are then provided to a digital summing circuit 312. Summing of signals 343 and 344 uses a complex form of addition, I±jQ by the summing circuit 312. Wherein $j=\sqrt{-1}$ and sign +/− depends on the original down-conversion condition that received signal frequency is higher or lower than the local oscillator frequency. The mathematical symbol j has a physical meaning of $\pi/2$ phase shift. The operation of the complex summing in the digital domain results in unfolding the spectra of signals 343 and 344 and summing them in proper phase shift to obtain a spectrum shown as 490 in FIG. 4e.

Figure 4E:
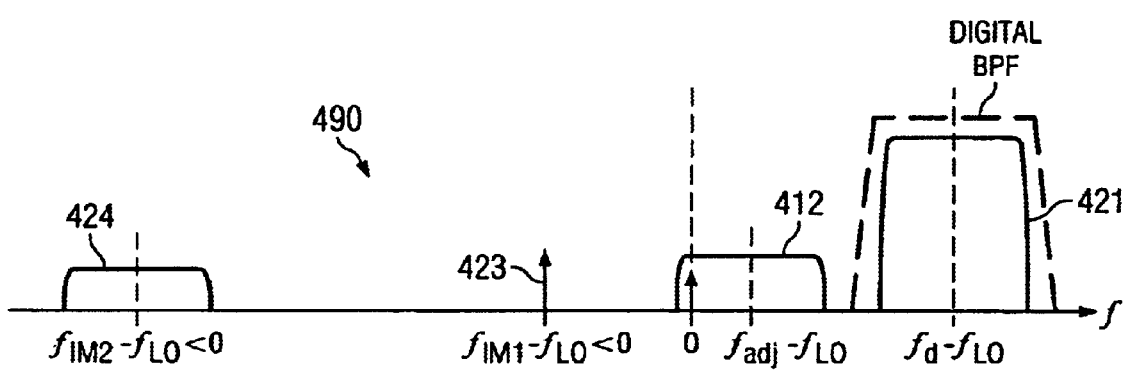

The output of summing component 312 is then provided to a digital filter 313 which selects the desired signal 421 of FIG. 4e from the output of summing circuit 312. Filter 313 may be a digital band-pass filter that operates to suppress interference and unwanted signals outside the low frequency carrier desired signal. The resulting output 314 may then be provided to a base band processor 207. Processor 207 may perform shifting the signal carrier to zero frequency, CDMA de-spreading, de-interleaving, decoding, and demodulating to obtain the desired voice and/or data.

FIG. 4a shows exemplary signals 400 at input 301 of the RF-to-digital signal processing circuitry 300. The signals 400 include a desired signal 401 having a bandwidth of 3.84 MHz centered around a carrier frequency $f_d$; an adjacent channel interferer 402 having a bandwidth of 3.84 MHz centered around a carrier frequency $f_{adj}=(f_d-5 \text{ MHz})$; an intermodulation interferer 403 having a frequency $f_{IM1}=(f_d-10 \text{ MHz})$, and a second intermodulation interferer 404 having a 3.84 MHz bandwidth centered around a carrier frequency $f_{IM2}=(f_d-20 \text{ MHz})$. The first intermodulation interferer 403 may be a single tone signal and the second intermodulation interferer 404 may be a QPSK modulated signal.

In the circuitry 300, signals 400 are down-converted by mixing with a local oscillator signal of oscillator 340 having an oscillator frequency $f_{LO}$. When the signals 400 are down-converted by mixing with local oscillator signal $f_{LO}$, signal frequencies 406 greater than the local oscillator frequency $f_{LO}$ are reduced in frequency by $f_{LO}$ Hz. Thus, if $f_{LO}=100$ MHz, all signals greater than 100 MHz will be reduced in frequency by 100 MHz. On the other hand, when the signals 400 are down-converted, signal frequencies 405 less than the local oscillator frequency $f_{LO}$ are folded. The folded frequency signals can be calculated by subtracting received signal frequencies from the local oscillator frequency $f_{LO}$. Thus, if $f_{LO}=100$ MHz, all signals less than 100 MHz will be mapped to a new signal at 100 MHz minus the original signal. For example, if $f_{LO}=100$ MHz and a received signal has a frequency of 95 MHz, a folded signal at 5 MHz is produced.

The output of a signal mixer will include both the frequency-reduced signals and the folded signals produced during down conversion. FIG. 4d shows the output 475 of an RF mixer after down conversion of signals 400 (FIG. 4a). Output 475 includes a frequency-reduced desired signal or referred, as low frequency carrier desired signal 411 produced by down conversion of the received signal 401, as well as other frequency-reduced and folded signals or interferers. For clarity, the frequency-reduced signals are shown separately in FIG. 4b, and the folded signals are shown separately in FIG. 4c. Note that the exemplary adjacent channel interferer 402 includes signal components above and below the local oscillator frequency $f_{LO}$. Therefore, during down-conversion, portions of 402 are reduced in frequency and form the signal 412a (FIG. 4b), while portions of 402 are folded and form the signal 412b (FIG. 4c). In the mixer output (FIG. 4d), reduced and folded signal portions 412a and 412b are overlapped.

The desired signal 401 can become corrupted during formation of the frequency-reduced desired signal 411. For example, corruption of signal 411 may occur if signal folding results in interferer signals overlapping signal 411. The selection of an appropriate local oscillator frequency $f_{LO}$ can help to minimize corruption of the frequency-reduced desired signal. In general, a local oscillator frequency $f_{LO}$ should be selected so that interfering signals that are subject to folding will be folded onto frequencies that are either greater or less than those occupied by the low frequency carrier desired signal 411. For the signals of FIG. 4a, selecting a local oscillator value $f_{LO}$ that is 6.25 MHz less than the desired signal carrier $f_d$, will result in folded signal 414 having a carrier frequency $(f_{LO}-f_{IM2})$ that is 13.75 MHz greater than the desired signal 411 carrier frequency $(f_d-f_{LO})$, and folded interferer 413 at a frequency $(f_{LO}-f_{IM1})$ that is 3.75 MHz less than the carrier frequency $(f_d-f_{LO})$. Thus, folded interferer 413 and 414 will not overlap the desired channel 411. Folded interferer 412 is similarly outside the bandwidth occupied by the low frequency carrier desired signal 411.

In some implementations, folding of interferer signals onto the frequency-reduced desired signal may be difficult to avoid. In such implementations, the RF-to-digital signal processing circuitry 206 may down convert the RF signal 301 using a quardrature I and Q converter architecture. In the quardrature I and Q architecture, multiple RF image rejection mixers may be used as shown in FIG. 3a. The two signal mixers may receive a local oscillator signal having the same frequency, but with a $\pi/2$ phase difference.

Figure 5:
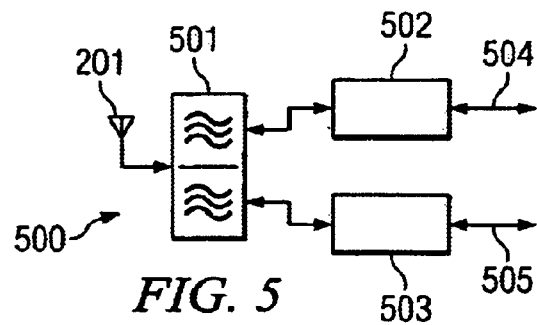
FIG. 5 is a block diagram of a mobile communications system according to an alternative embodiment of the invention.

In a mobile station implementation, multiple sets of signal reception, transmission, and processing circuit elements 203–213 may be included within a single mobile station. For example, referring to FIG. 5, a mobile station may include circuitry 502 to process WCDMA and circuitry 503 to process IS-95B signals. The circuits 502 and 503 may be connected to antenna 201 by a signal duplexer 501. The circuits 502 and 503 may each contain circuitry similar to circuitry 203–213 (FIG. 2) that is tuned to the particular frequencies and bandwidths needed.

FIG. 3b shows an alternative implementation of RF-to-digital processing circuitry. In the implementation 350, the operation of circuit elements 351–359 corresponds to the operation of circuit elements 323–330 and 313 of implementation 300. The implementation 350 includes only a single channel and, therefore, there is no need to implement a channel summing function 312.

Figure 6A:
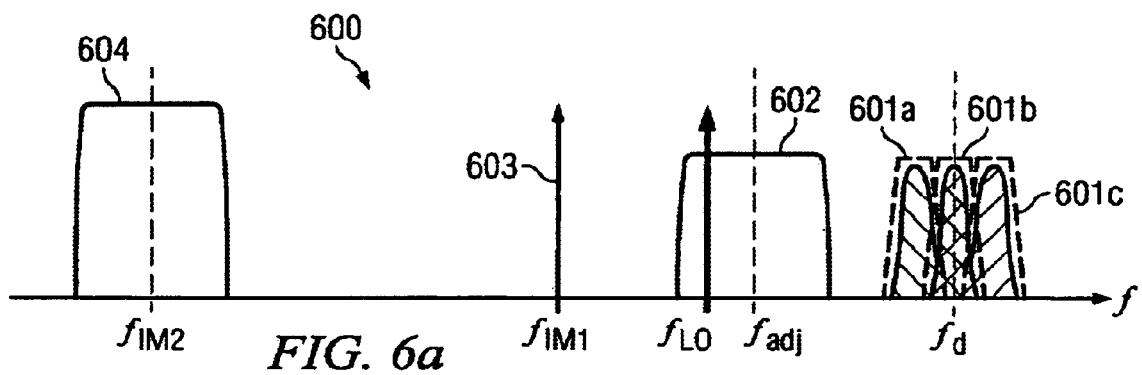
FIGS. 6a and 6b are exemplary signal diagrams of signal processing in the circuitry of FIG. 5.
Figure 6B:
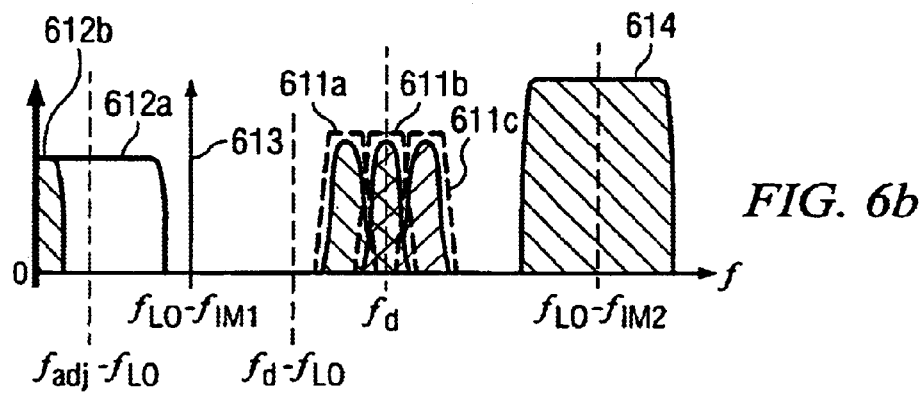

A PDC receiver may also be used in a multicarrier CDMA system. FIG. 6a is a signal diagram showing signals that may be received at a PDC receiver in a MC-CDMA receiver and FIG. 6b shows the signals of FIG. 6a after down-conversion in the PDC receiver. In a multi-carrier system, multiple separate RF signals 601a–601c bear the information data. For example, three 1.23 MHz signals, 601a–601c, form a multi-carrier signal. The center signal 601b may have a carrier frequency $f_d$, and the carrier frequencies of signals 601a and 601c may be $f_d-1.25$ MHz and $f_d+1.25$ MHz, respectively. Additionally, the received signals may include unwanted (interference) signals 602 and 604 (which also may be divided into multiple sub-signals) and one or more single tone interferers 603. The signals 601a–601c may be processed by filtering and amplification circuitry 303–311 and 323–331 in the same manner as signal 401 of a (that is, signals 601a–601c may be treated as a single signal). However, the digital band-pass filtering circuitry 313 may separate each of signals 601a–601c for further processing by CDMA RAKE receiver circuitry connected to the output 314.

The invention has been described primarily in the context of a WCDMA implementation. However, the invention may be used in other mobile phone systems, home wireless phone systems, and with other types of coherent demodulators including non-wireless coherent demodulators. For example, the disclosed channel estimator may be used in 900 MHz wireless home phone equipment, wireless local area networking equipment, CDMA and phase shift modulation systems operating over copper pair interconnections, and other systems wherein phase shifts incurred by a reference signal are to be determined.

The invention may be implemented using analog electronic circuitry, digital electronic circuitry, or in computer hardware, firmware, software, or in combinations of them. Apparatus of the invention may be implemented in a computer program product tangibly embodied in a machine-readable storage device for execution by a programmable processor, and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors and digital signal processors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices which may be implemented as separate devices or integrated with a processor. Any of the foregoing may be supplemented by, or incorporated in, specially-designed ASICs (application-specific integrated circuits).

Still other embodiments are within the scope of the following claims.

What is claimed is:

1. A method of processing a received signal comprising:
   mixing the received signal with a local oscillator signal to form a frequency down converted signal, wherein the frequency down converted signal comprises a frequency reduced desired signal that is a modulated non-zero low frequency carrier;
   amplifying and sampling the frequency reduced desired signal to form a digital representation of the frequency reduced desired signal; and
   the received signal includes a desired signal at a desired signal frequency and the local oscillator signal comprises a signal at a local oscillator frequency, said desired signal frequency being less than the local oscillator frequency.

2. The method of claim 1 wherein the local oscillator frequency and the desired signal frequency differ by at least 1 MHz but by no more than 25 MHz.

3. The method of claim 1 wherein the received signal comprises QPSK modulated CDMA data.

4. A method of processing a received signal comprising:
   mixing the received signal with a local oscillator signal to form a frequency down converted signal, wherein the frequency down converted signal comprises a frequency reduced desired signal that is a modulated non-zero low frequency carrier;
   amplifying and sampling the frequency reduced desired signal to form a digital representation of the frequency reduced desired signal; and
   the received signal includes a desired signal at a desired signal frequency and the local oscillator signal comprises a signal at a local oscillator frequency, said desired signal frequency being greater than the local oscillator frequency.

5. The method of claim 4 wherein the local oscillator frequency and the desired signal frequency differ by at least 1 MHz but by no more than 25 MHz.

6. The method of claim 4 wherein the received signal further comprises an interferer signal, the interferer signal comprises a signal at an interferer signal frequency; the interferer signal frequency being less than the desired signal frequency, and the local oscillator frequency being greater than the interferer signal frequency; and
   the frequency down-converted signal further comprises a folded signal produced by the mixing of the interferer signal and the local oscillator signal.

7. The method of claim 6 wherein frequencies of the folded signal are greater than the reduced desired signal frequency.

8. The method of claim 6 further comprising the step of filtering the frequency down-converted signal to attenuate signal frequencies outside a spectrum of reduced desired signal frequency, the attenuated signal frequencies comprising frequencies in a spectrum of the folded signal.

9. The method of claim 6 further comprising the steps of:
   folding the interferer signal onto frequencies lower than the frequency of the desired signal frequency; and
   filtering the down converted signal to attenuate frequencies outside the spectrum of the reduced desired signal frequency.

10. The method of claim 6 further comprising the steps of:
    folding the interferer signal onto frequencies greater than the frequency of the desired signal frequency; and
    filtering the dowel converted signal to attenuate frequencies outside the spectrum of the reduced desired signal frequency.

11. A method of processing a received signal comprising:
    mixing the received signal with a local oscillator signal to form a frequency down converted signal, wherein the frequency down converted signal comprises a frequency reduced desired signal that is a modulated non-zero low frequency carrier;
    amplifying and sampling the frequency reduced desired signal to form a digital representation of the frequency reduced desired signal;
    said frequency down converted signal comprises a first frequency down converted signal, and said frequency reduced desired signal comprises a first frequency reduced desired signal, and wherein said method further comprises the steps of:
    phase-shifting the local oscillator signal and mixing the received signal and the phase-shifted local oscillator signal to form a second frequency down-converted signal, the second frequency down-converted signal comprising a second frequency reduced desired signal; and
    the first down-converted signal comprises a first folded signal and the second down-converted signal comprises a second folded signal, the first folded signal and the second folded signal having substantially the same frequency and magnitudes offset by $\pi/2$.

12. The method of claim 11 wherein the step of phase-shifting the local oscillator signal comprises phase-shifting by $\pi/2$ radians.

13. The method of claim 11 wherein the method further comprises the step of sampling the second frequency reduced desired signal and summing the digital representation of the first frequency reduced desired signal with a digital representation of the second frequency reduced desired signal to form digital representations of the first and second frequency reduced desired signals.

14. The method of claim 13 wherein said step of sampling comprises sampling at a sampling frequency of at least $((2 \times f_d) + BW)$, where $f_d$ is the non-zero low frequency carrier frequency and BW is the bandwidth of the frequency reduced desired signal.

15. The method of claim 13 wherein summing digital samples comprises (I±jQ) wherein I is the first frequency reduced signal, Q is the second frequency reduced signal, j= $\sqrt{-1}$ and sign +/− depends on the desired signal frequency compared to the local oscillator frequency.

16. A wireless receiving apparatus comprising:
an antenna circuitry configured to receive a radio frequency (RF) signal comprising a desired signal and an interferer, wherein the desired signal is at a desired signal frequency;
a local oscillator configured to output a local oscillator signal, the oscillator signal comprising a frequency less than the desired signal frequency;
a frequency down-converter coupled to said antenna circuitry and said local oscillator, said frequency down converter comprising a signal image rejection mixer for mixing the received RF signal with the local oscillator signal to form a frequency down converted signal;
an analog-to-digital converter coupled to said frequency down converter, said analog-to-digital converter having an input to receive the frequency down converted signal and to produce a digital representation of the frequency down converted signal.

17. The apparatus of claim 16 wherein said frequency down converter comprises a first frequency down converter, and said analog-to-digital converter comprises a first analog-to-digital converter, and said frequency down converter signal comprises a first frequency down converted signal, and wherein said apparatus further comprises:
phase shift circuitry coupled to said local oscillator, said phase shift circuitry for receiving the local oscillator signal and phase shifting the local oscillator signal to produce a phase shifted local oscillator signal;
a second frequency down-converter coupled to said phase shift circuitry and said antenna circuitry, said second frequency down converter for receiving said phase shifted local oscillator signal and producing a second frequency down converted signal; and
a second analog-to-digital converter coupled to the second frequency down-converter, said second analog-to-digital converter for receiving said second frequency down converted signal and producing a digital representation of the second frequency down converted signal.

18. The apparatus of claim 17 wherein the phase shift circuitry is configured to shift the phase of the local oscillator signal by π/2 radians.

19. The apparatus of claim 17 further comprising summing circuitry coupled to the first and second analog-to-digital converters, said summing circuitry for receiving digital representations of said first and second down converted signals and producing a summed signal.

20. The apparatus of claim 19 further comprising a QPSK demodulator coupled to the summing circuitry, said QPSK demodulator for demodulating said summed signal.

21. The apparatus of claim 20 further comprising a CDMA receiver coupled to said QPSK demodulator, said CDMA receiver for receiving the demodulated summed signal.

22. A method of receiving a signal at a mobile station, the method comprising:
mixing a received signal and a local oscillator signal to form a first frequency down-converted signal, wherein the received signal comprises a desired signal having a desired signal frequency and an interferer signal, and the first frequency down-converted signal comprises a first frequency reduced desired signal and a first folded interferer signal, the first frequency reduced desired signal being a modulated non-zero frequency carrier;
phase-shifting the local oscillator signal to generate a phase shifted local oscillator signal;
mixing the received signal and the phase-shifted local oscillator signal to form a second frequency down-converted signal, the second frequency down-converted signal comprising a second frequency reduced desired signal and a second folded interferer signal, the first and second folded interferer signal having magnitudes offset by π/2;
filtering the first and second frequency down-converted signals to attenuate frequencies greater than the spectrum occupied by the first and second frequency reduced desired signal, respectively;
digitally sampling the first frequency down-converted signal to generate digital samples of the first frequency down-converted signal;
digitally sampling the second frequency down-converted signal to generate digital samples of the second frequency down-converted signal;
summing the digital samples of the first frequency down-converted signal with the corresponding digital samples of the second frequency down-converted signal.

* * * * *